United States Patent Office 3,337,052
Patented Aug. 22, 1967

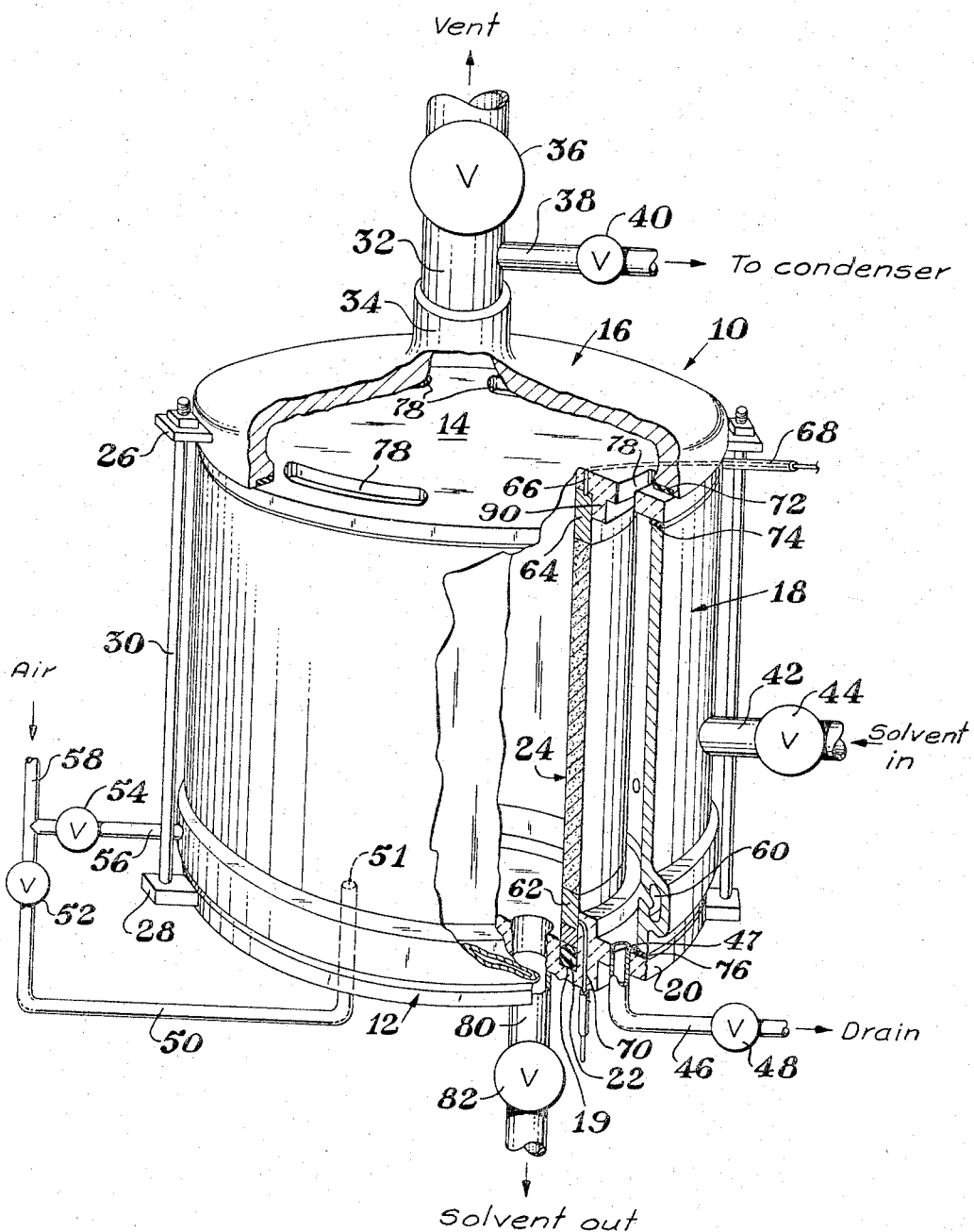

3,337,052
FILTER APPARATUS
Herman Knieriem, Jr., Midland, Mich., assignor to The Dow Chemical Company, Midland, Mich., a corporation of Delaware
Filed Oct. 2, 1964, Ser. No. 401,094
3 Claims. (Cl. 210—177)

ABSTRACT OF THE DISCLOSURE

Filter apparatus comprising an outer housing having a detachable top, an inner cartridge assembly having a sintered filter element as a substantial part of its side wall. The cartridge assembly fits between a base plate and top plate and is spaced from the outer housing whereby fluid entering the housing passes through the filter on entering the cartridge and then passes out of the housing. Electrical connections across the filter provide means for passing current through the filter to heat the filter and burn any material caught on the filter. Gas purge means are provided for blowing ashes from the assembly.

This invention relates to filters and particularly to filter apparatus which is useful for clarifying a solvent stream.

Filters for clarifying product streams, such as filters for clarifying the solvent in a dry cleaning machine, for example, are normally of the type which require discarding either the filter aid (diatomaceous earth, for example) or the filter media (paper, cloth, or metal cartridges, for example).

Either of the above procedures results in labor costs, some loss of solvent, and the expense of providing new filter aid or filter media.

Accordingly, a principal object of this invention is to provide an improved filter apparatus for clarifying pumpable streams.

Another object of this invention is to provide improved filter apparatus in which the filter element may be cleaned in situ.

A further object of this invention is to provide an improved filter apparatus in which the filter element is more or less permanently useful for the life of the entire filter apparatus.

In accordance with this invention, there is provided filter apparatus comprising an outer housing having a detachable top, an inner cartridge assembly having a sintered filter element as a substantial part of its side wall, the cartridge assembly fitting between a base plate and top plate and being spaced from the outer housing whereby fluid entering the housing passes through the filter on entering the cartridge and then passes out of the housing. Electric connections across the filter provide means for passing current through the filter to heat the filter and burn any material caught on the filter. Gas purge means are provided for blowing ashes from the assembly.

The invention, as well as additional objects and advantages thereof, will best be understood when the following detailed description is read in connection with the accompanying drawing which is an isometric view of filter apparatus in accordance with this invention.

Referring to the drawing, there is shown filter apparatus, indicated generally by the numeral 10, comprising a base plate 12, a top plate 14, a tubular filter element, indicated generally by the numeral 24, disposed between and contacting said plates 12, 14, an outer housing wall 18, and an upper housing 16. The outer housing wall 18 is generally tubular in configuration, of larger diameter than the filter element 24, and is disposed between and in contact with the plates 12, 14.

The upper or top housing 16 is an inverted shallow cup shaped member which has an axially aligned outlet bore 34 therein.

The entire assembly is held together by means of bolts 30 which extend between the brackets 26, 28 which extend from the periphery of the base plate 12 and upper housing 16, respectively.

The upper housing 16 and the side wall part 18 are each sealed to and separated from actual contact with the upper or top plate 14 by means of insulating gaskets 72, 74, respectively.

An insulating gasket 76 is provided between the side wall part 18 and the peripheral part 20 of the base plate 12.

The side wall part 18 contains a slotted jacket 60 near its lower end. An air line 58 is coupled, through valve 54 and line 56 to the slotted jacket 60 and through the valve 52 and line 50 to the interior of the apparatus through a bore 51 in the base plate 12.

The side wall part 18 also has a solvent inlet line 42 coupled thereto, the line 42 having a valve 44 incorporated therein.

A solvent outlet line 80 is coupled through the base plate 12 to the interior of the apparatus 10 and has a valve 82 incorporated therein.

A separate drain line 46, having a valve 48 incorporated therein, is coupled through the base plate 12 through the bore 47 in the space between the filter element 24 and the side wall 18.

A vent line 32, having a valve 36 therein, is coupled to the outlet bore 34. A line 38, having a valve 40 therein, is coupled to the vent line 32 between the bore 34 and the valve 36.

Referring now to the disposition and structure of the filter element 24 within the apparatus, the filter element 24 is composed of a tubular member whose central part is made of sintered metal or metal-ceramic material which has rather high electrical resistance. The upper and lower end parts 62, 64 of the filter element 24 are composed of metal, such as copper, for example.

A pair of electrical cables 68, 70 are coupled by any suitable means through the upper housing 16 and base plate 12 and, as shown at 66, through the top plate 14 to contact the end 64 of the filter element 24. The lead 70 contacts the end 62 of the filter element.

The top plate 14 has a downwardly extending rim 90 which is adapted to fit slidably but closely over the outer surface of the end part 64 of the filter element 24. A plurality of slots 78 also extend through the top plate 14.

The base plate 12 has an annular groove 19 in the surface which faces the filter element 24. An O-ring resilient seal 22 is disposed within the groove 19. The end part 62 of the filter element 24 fits slightly within the groove 19, the resilient O ring permitting expansion and contraction of the filter 24 to take place without undue strain on either the filter element, the base plate, or top plate.

In operation, with the screws 30 tightened to provide a seal between the various components, solvent which contains particulate matter enters the apparatus 10 through the line 42, passes through the filter element 24 and out of the solvent output line 80.

As the particulate matter builds up on the surface of the filter element 24, the increased pressure drop across the filter indicates that cleaning of the filter is needed.

The valves 44 and 82 are closed, and the drain valve 48 is opened to remove solvent from the apparatus.

Current from any suitable source of electrical energy is applied across the filter 24 through the leads 68, 70. The current applied is such that the porous central part of the filter 24 is heated, because of its high electrical resistance, to an extent such that the particulate material on the surface of the filter is either oxidized or loosened.

As the filter element is heated, any solvent vapor is withdrawn from the apparatus through the line 38 and valve 40 and passed through a condenser (not shown).

As the particulate material is loosened or oxidized, air (which may be pre-heated) from any suitable source is forced through the lines 56 and 50, blowing ash and any loosened particulate material away from the filter element 24 and out the vent line 32 through the opened valve 36.

After the filter is thus cleaned, current to the element 24 is interrupted, the appropriate air line, vent, and drain valves closed, and the solvent inlet and output valves opened, and the filter is returned to service.

The porous part of the filter 24 may be made of sintered tungsten, for example, or of porous ceramic-metallic mixtures which may be heated to 500° F. or more.

The base plate and top plate 14 may be made of ceramic. The upper housing 16 and the side wall 18 are usually made of metal.

Thus, it may be seen that this invention provides a filter device in which solvent is not lost as the filter is cleaned, there is no replacement of either the filter material or filter media, and only a minimum of mechanical labor involved.

What is claimed is:

1. Filter apparatus comprising:
   (A) a filter element including a part composed of a porous electrically conductive sintered material including metal particles having substantial electrical resistance and being of hollow tubular configuration;
   (B) jacket means for introducing fluid to be filtered on one side of said filter element, said jacket extending around substantially one entire peripheral surface of said filter element;
   (C) means in communication with another side of said filter element for withdrawing filtered fluid from said apparatus;
   (D) electrical means coupled across said filter element for heating said filter element;
   (E) means for introducing gas on each side of said filter element and for withdrawing gas from said apparatus whereby material on said filter element may be blown from said apparatus, and
   (F) means for coupling vapor reclaiming means to said apparatus.

2. Apparatus in accordance with claim 1, wherein said electrically conductive material is sintered tungsten.

3. Apparatus in accordance with claim 1, wherein said electrically conductive material is a sintered mixture of metallic particles and a ceramic material.

References Cited

UNITED STATES PATENTS

| | | | |
|---|---|---|---|
| 1,348,159 | 8/1920 | Down | 210—68 |
| 2,103,434 | 12/1937 | Pennebaker | 210—185 |
| 2,301,803 | 11/1942 | Davis | 210—68 |
| 2,979,400 | 4/1961 | Mouwen | 210—510 X |
| 3,061,102 | 10/1962 | Mayer | 210—436 X |
| 3,102,395 | 9/1963 | Gould | 55—466 X |
| 3,163,028 | 12/1964 | De Pas et al. | 210—184 X |
| 3,254,772 | 6/1966 | Hornbostel | 210—408 |
| 3,268,080 | 8/1966 | Eberly | 210—180 |

REUBEN FRIEDMAN, *Primary Examiner.*

C. DITLOW, *Assistant Examiner.*